United States Patent

Tobi et al.

Patent Number: 5,603,225
Date of Patent: Feb. 18, 1997

[54] MULTI-TYPE AIR CONDITIONER ADDRESS SETTING METHOD AND ADDRESS SETTING DEVICE

[75] Inventors: Yukio Tobi, Ohta; Kouichi Saruhashi, Gunma-ken; Kouichi Matumoto, Kumagaya, all of Japan

[73] Assignee: Sanyo Electric Co., Ltd., Osaka, Japan

[21] Appl. No.: 423,507

[22] Filed: Apr. 18, 1995

[30] Foreign Application Priority Data

Apr. 19, 1994 [JP] Japan .................................. 6-080767

[51] Int. Cl.⁶ ........................................ F25B 49/02
[52] U.S. Cl. ........................... 62/175; 165/211; 236/51
[58] Field of Search ............... 62/125, 126, 127, 62/129, 175, 510, 115; 165/12, 22; 236/51; 340/870.16, 870.17, 825.06, 825.07, 825.52

[56] References Cited

U.S. PATENT DOCUMENTS

| | | |
|---|---|---|
| 4,526,010 | 7/1985 | Sato et al. . |
| 4,811,897 | 3/1989 | Kobayashi et al. .................. 236/51 X |
| 5,207,071 | 5/1993 | Ozu et al. ............................. 62/175 |
| 5,271,453 | 12/1993 | Yoshida et al. ...................... 165/22 |
| 5,279,458 | 1/1994 | DeWolf et al. ...................... 165/22 X |
| 5,383,336 | 1/1995 | Nishida et al. ...................... 62/175 X |
| 5,390,506 | 2/1995 | Sogabe et al. ....................... 62/175 |

FOREIGN PATENT DOCUMENTS

| | | |
|---|---|---|
| 6361835 | 8/1986 | Japan . |
| 363446 | 7/1989 | Japan . |
| 3-11256 | 1/1991 | Japan . |
| 4288440 | 3/1991 | Japan . |

Primary Examiner—Harry B. Tanner
Attorney, Agent, or Firm—Knobbe, Martens, Olson & Bear

[57] ABSTRACT

A multi-type air conditioner address setting method and address setting device for automatically setting an address with a simple structure. A dummy address sent from an exterior device is stored in an interior device. The interior device determines whether the interior device itself is operating in a designated operation mode. When the interior device is operating in the designated operation mode, the dummy address is set as an actual address. When an address request signal is sent from the exterior device, the set address is sent back thereto.

19 Claims, 10 Drawing Sheets

MULTI-TYPE AIR CONDITIONER ADDRESS SETTING METHOD AND ADDRESS SETTING DEVICE

BACKGROUND OF THE INVENTION

1. Field of the Invention

The present invention relates to a multi-type air conditioner address setting method and address setting device, and in particular, to a multi-type air conditioner address setting method and device for setting the addresses of interior units of a multi-type air conditioner in which the interior units are connected, via coolant pipes and signal wires, to coolant pipe connecting portions and signal wire connecting portions of a single exterior unit, which is provided with a plurality of the coolant pipe connecting portions and signal wire connecting portions.

2. Description of the Related Art

In a multi-type air conditioner, a single exterior unit and a plurality of interior units are connected at an installation locale via coolant pipes and signal wires. If there is faulty connection of the coolant pipe connecting portions (valves) or signal wire connecting portions (connectors) of the exterior unit, much time is requires to confirm the connections.

Conventionally, as disclosed in Japanese Patent Application Laid-Open No. 3-11256, interior heat exchanger temperature sensors which detect the temperatures of interior heat exchangers are provided at the respective interior units, and valve temperature sensors (gas branch-pipe temperature sensors) are disposed at the respective coolant pipe connecting portions of the exterior unit, so that the status of connection of the interior units can be confirmed. In this method, first, numbers (i.e., addresses DC1 through DC4) are given in advance to the respective interior heat exchanger temperature sensors, and addresses DG1 through DG4 are given to the respective valve temperature sensors. Next, any one of flow regulating valves is completely opened, and one of the interior units is operated at a designated mode (e.g., a cooling mode). The address of the interior heat exchanger temperature sensor whose temperature has dropped and the address of the valve temperature sensor whose temperature has dropped are detected, and are stored in correspondence. Then, during normal operation, the respective interior units are controlled on the basis of the stored contents.

However, the above-described conventional method has a drawback in that it is necessary to set the address of each sensor in advance, and address setting requires much work. Further, because it is necessary to dispose a temperature sensor at each of the interior units and coolant pipe valves, the structure of the device is complex. Moreover, control is complicated as the corresponding relationships between the valves and the connected interior units must always be referred to.

SUMMARY OF THE INVENTION

In view of the aforementioned, an object of the present invention is to provide a multi-type air conditioner address setting method and address setting device which can, with a simple structure, automatically set addresses without necessitating advance setting of addresses.

In order to achieve the above-described object, in accordance with a first aspect of the present invention, there is provided a multi-type air conditioner address setting method for a multi-type air conditioner in which a single first unit and a plurality of second units are connected by coolant pipes and signal wires such that a cooling cycle for air conditioning operation is formed by the single first unit and the plurality of second units, the first unit having a plurality of coolant pipe connecting portions for connection with the coolant pipes connected to the respective second units and a plurality of signal wire connecting portions for connection with the signal wires connected to the respective second units, said address setting method comprising: an operating step in which coolant is supplied from the first unit, via a coolant pipe connected to one of the plurality of coolant pipe connecting portions, to a second unit connected to the coolant pipe so that the second unit is operated in a predetermined state; a dummy address sending step in which a dummy address is sent from the first unit, via a signal wire connected to one of the plurality of signal wire connecting portions, to a second unit connected to said signal wire; a personal address storing step in which the second unit which receives the dummy address from the first unit via said signal wire determines whether the second unit is operating in the predetermined state, and in a case in which it is determined that the second unit is operating in the predetermined state, the second unit stores the dummy address sent from the first unit as the personal address of the second unit; an address storing repeating step in which said operating step, said dummy address sending step, and said personal address storing step are repeated for second units which are connected to coolant pipes connected to coolant pipe connecting portions other than said one coolant pipe connecting portion, so that all of the second units store respective personal addresses; and an address sending-back step in which the first unit sends an address request signal from the plurality of signal wire connecting portions to the respective second units to cause the respective second units to send back the personal addresses stored in the respective second units to the first unit, wherein said first unit determines the addresses of the second units connected to the signal wire connecting portions on the basis of which of the signal wire connecting portions the personal addresses of the respective second units sent back in said address sending-back step were sent back through.

Further, in accordance with a second aspect of the present invention, there is provided a multi-type air conditioner address setting device for a multi-type air conditioner in which a single first unit and a plurality of second units are connected by coolant pipes and signal wires such that a cooling cycle for air conditioning operation is formed by the single first unit and the plurality of second units, the first unit comprising: a plurality of coolant pipe connecting portions for connection with the coolant pipes connected to the respective second units and a plurality of signal wire connecting portions for connection with the signal wires connected to the respective second units; operating means for operating each of the second units in a predetermined state by supplying coolant, via the coolant pipes connected to the plurality of coolant pipe connecting portions, from the first unit in order to the second units connected to the respective coolant pipes; dummy address sending means for sending a dummy address from the first unit, via the signal wires connected to the plurality of signal wire connecting portions, to the second units connected to the respective signal wires; address request signal sending means for sending an address request signal from the plurality of signal wire connecting portions to each of the second units; and storing means for storing addresses sent back from the second units via the signal wire connecting portions in response to the address request signal, and each of the second units comprising:

determining means for determining whether the second unit is operating in the predetermined state when the dummy address is received from the first unit via the signal wire; personal address storing means for, in a case in which said determining means determines that the second unit is operating in the predetermined state, storing the dummy address already sent from the first unit as a personal address of the second unit; and sending-back means for sending back, as address data, the personal address stored in said personal address storing means when the address request signal is received from the first unit via the signal wire.

The multi-type air conditioner of the first and second aspects of the present invention is structured such that second units are connected, via coolant pipes and signal wires, to the coolant pipe connecting portions and signal wire connecting portions of the single first unit which is provided with a plurality of the coolant pipe connecting portions and signal wire connecting portions. The first unit may be an exterior unit or an interior unit. When the first unit is an exterior unit, the second units are interior units. When the first unit is an interior unit, the second units are exterior units.

The above and other objects, features and advantages of the present invention will become apparent from the following description and the appended claims taken in conjunction with the accompanying drawings in which a preferred embodiment of the present invention is shown by way of illustrative example.

DESCRIPTION OF THE PREFERRED EMBODIMENT

Figure 1:
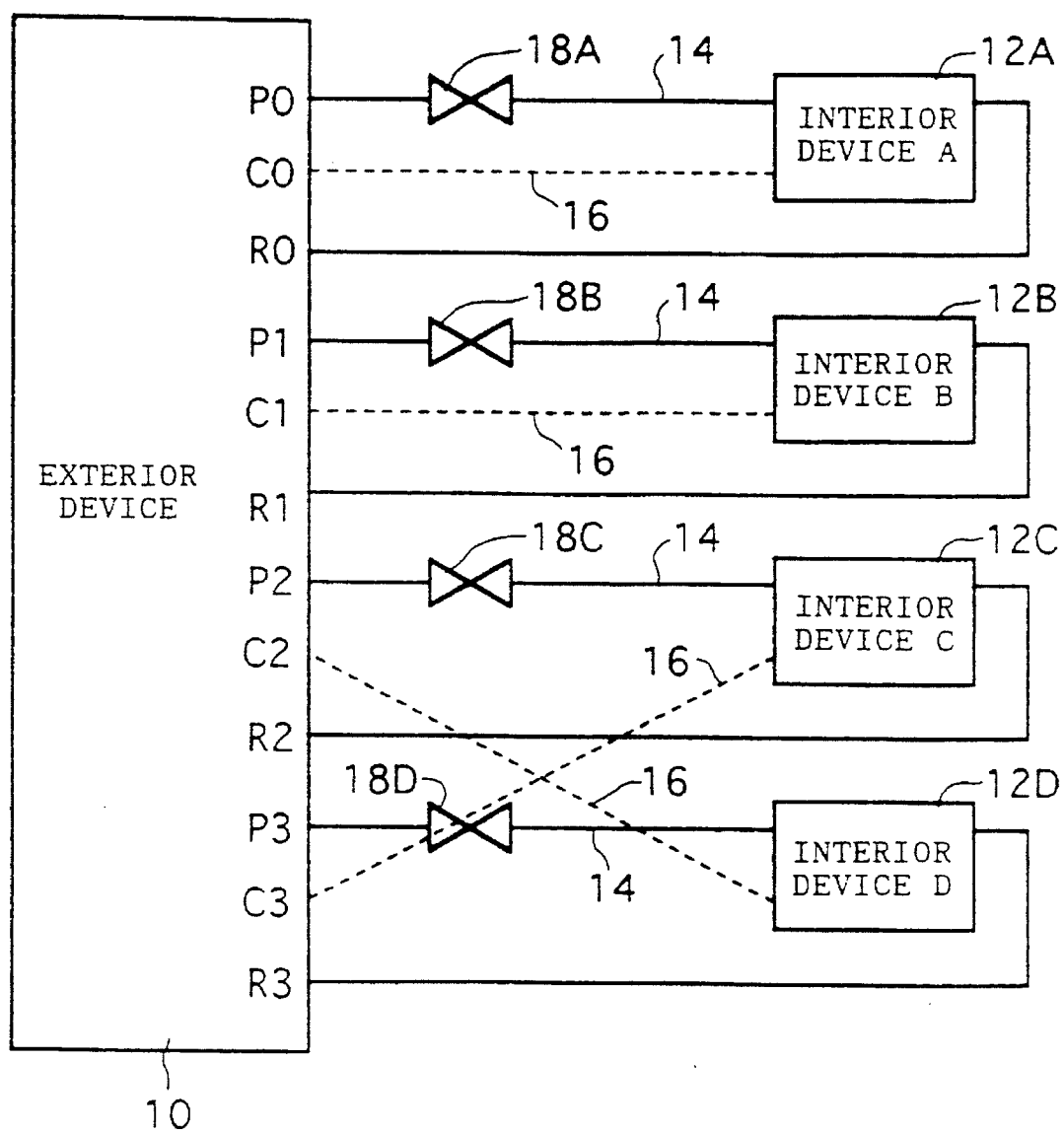
FIG. 1 is a block diagram of a multi-type air conditioner of an embodiment of the present invention.

The embodiments of the present invention will be described in detail hereinafter with reference to the accompanying drawings. As illustrated in FIG. 1, a multi-type air conditioner of the present embodiment is provided with an exterior device (exterior unit) 10 having a plurality of coolant pipe connecting ports P0 through P3 and R0 through R3, and a plurality of signal wire connectors C0 through C3. Four interior devices (interior units) 12A through 12D are connected to the coolant pipe connecting ports and the signal wire connectors via coolant pipes 14 and signal wires 16. Flow regulating valves 18A through 18D, which regulate the flow rates of the coolant flowing through the pipes, are provided at the respective coolant pipes 14.

Figure 2:
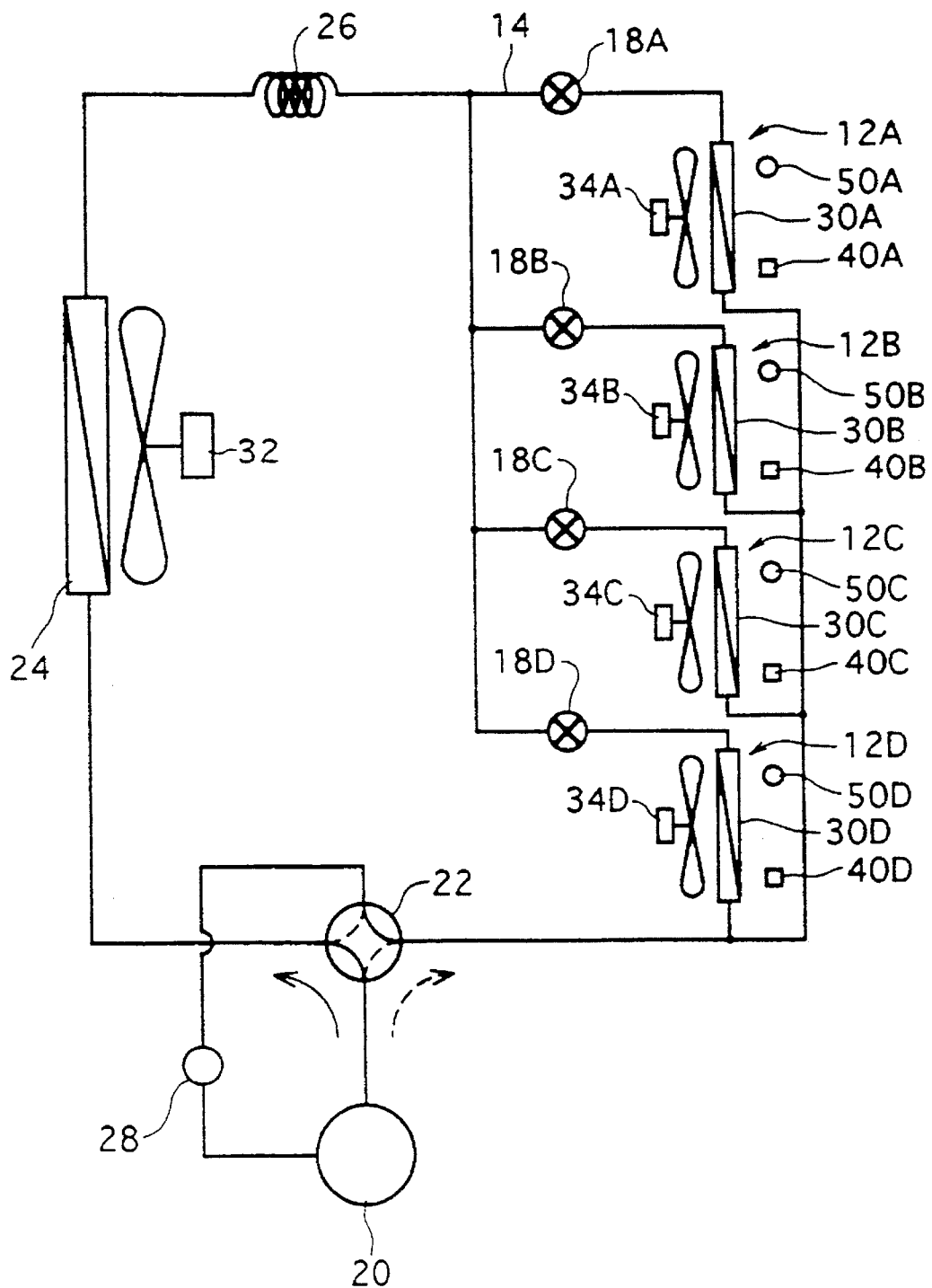
FIG. 2 is a schematic view illustrating a cooling cycle of FIG. 1.

FIG. 2 illustrates a cooling cycle of the multi-type air conditioner of FIG. 1. The exterior device 10 is formed by a compressor 20, a four way type valve 22, an exterior device heat exchanger 24, a capillary tube 26, and an accumulator 28. The exterior device 10 is connected together with interior device heat exchangers 30A through 30D in a ring shape by the coolant pipes 14 so as to form a cooling cycle. The interior device heat exchangers 30A through 30D are connected in parallel in the cooling cycle.

In the multi-type air conditioner, when the four way type valve 22 is in the state illustrated by the solid lines in the drawing, coolant discharged from the compressor 20 flows in the direction indicated by the solid arrow. The coolant is condensed at the exterior device heat exchanger 24 and passes through the capillary tube 26. Thereafter, the coolant evaporates at those interior device heat exchangers whose flow regulating valves are open so that cooling of the interiors is effected by the heat of vaporization at this time. Further, when the four way type valve is in the state illustrated by the broken lines in the figure, coolant discharged from the compressor 20 flows in the direction indicated by the broken arrow. The coolant is condensed at those interior device heat exchangers whose flow regulating valves are open, and passes through the capillary tube 26. Thereafter, the coolant evaporates at the exterior device heat exchanger 24 so that heating of the interiors is effected by the heat of condensation at the time that the coolant condenses.

Reference numeral 32 is an exterior air blower which blows air to the exterior device heat exchanger 24, and 34A through 34D are interior air blowers which blow air to the interior device heat exchangers 30A through 30D, respectively. Further, the interior devices are provided with temperature sensors 40A through 40D, which detect the temperatures (coil temperatures) of the interior device heat exchangers, and room temperature sensors 50A through 50D which detect the temperatures of the interiors at which the interior devices are disposed.

Figure 3:
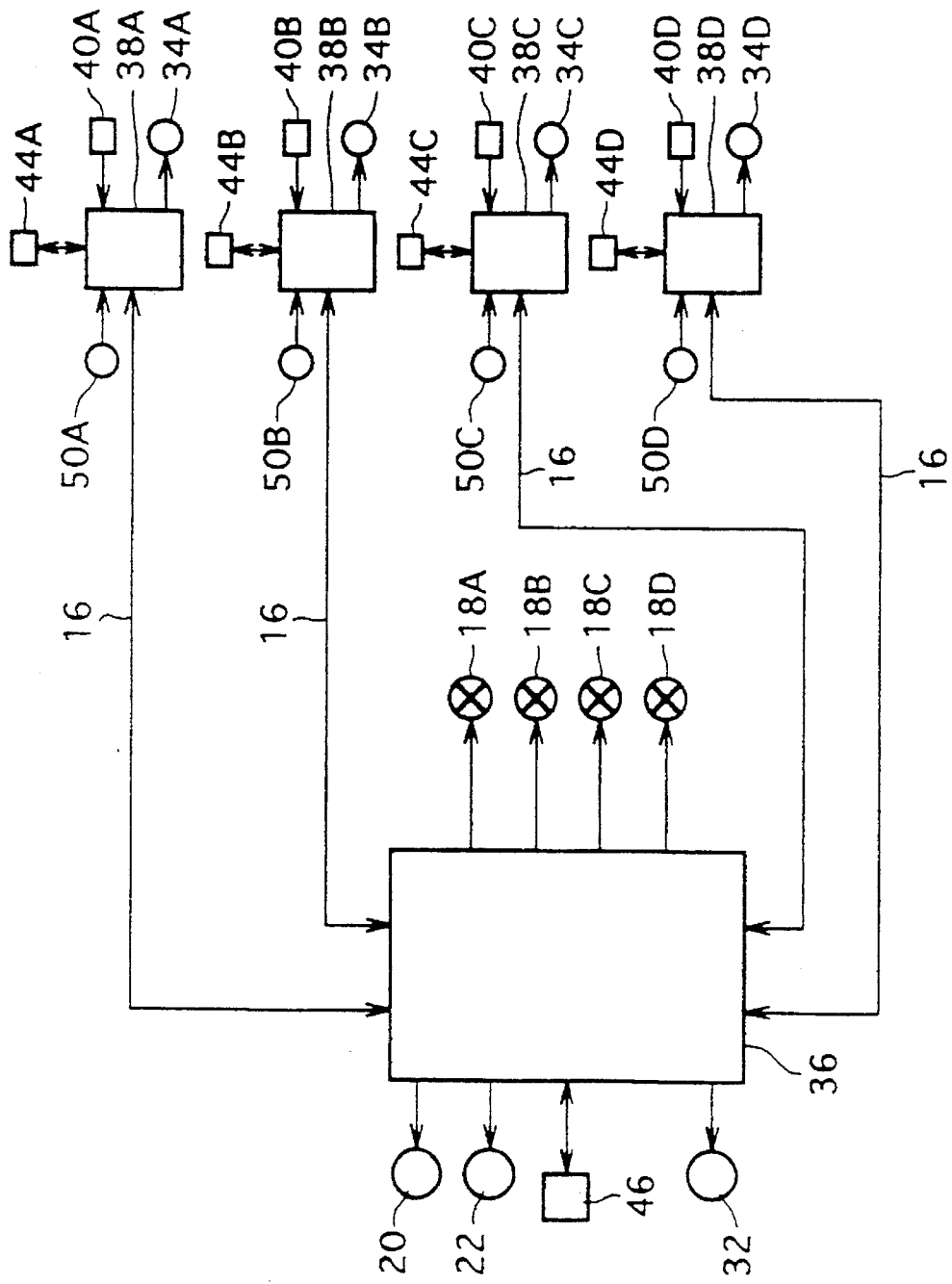
FIG. 3 is a block diagram illustrating a control circuit of FIG. 1.

FIG. 3 illustrates a control circuit of the multi-type air conditioner of FIG. 1. A control apparatus 36 is provided within the exterior device 10. The control apparatus 36 is structured by microcomputer or the like equipped with a RAM and a ROM in which the program of an address setting routine which will be described later is stored. Control devices 38A through 38D, which are provided at the interior devices 12A through 12D respectively and which each are structured by a microcomputer or the like, are connected to the control apparatus 36 such that communication between the control apparatus 36 and the respective control devices 38A through 38D is possible. Further, a nonvolatile memory 46, which comprises a PROM, a backup RAM backed up by a battery, and the like for storing the set addresses, is connected to the control apparatus 36. The control apparatus 36 is also connected via unillustrated drivers to the flow regulating valves 18A through 18D which are structured such that the respective degrees of opening thereof can be regulated. Further, the control apparatus 36 is also connected to the compressor 20, the four way type valve 22 and the exterior air blower 32 so as to be able to control these elements.

Similarly to the control apparatus 36, each of the control devices 38A through 38D is provided with a RAM and a ROM in which the program of the address setting routine which will be described later is stored. The temperature sensors 40A through 40D which detect coil temperatures, nonvolatile memories 44A through 44D which comprise backup RAMs, PROMs and the like, the room temperature sensors 50A through 50D which detect the temperatures of the interiors, and the interior device air blowers 34A through 34D are connected to the control devices 38A through 38D respectively.

Figure 8:
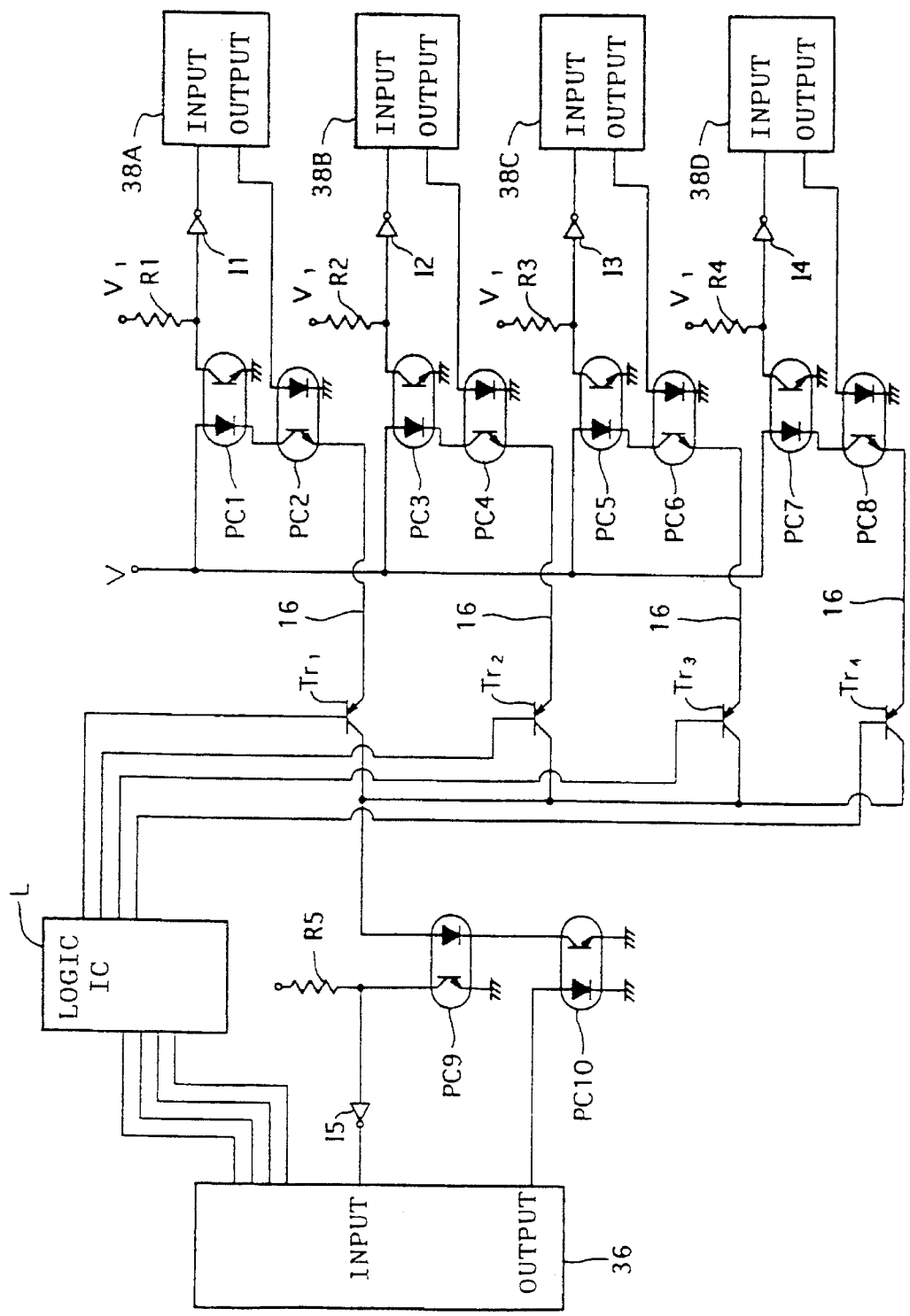
FIG. 8 is a circuit diagram illustrating a specific example of a connecting circuit which connects the exterior device control device and interior device control devices.

FIG. 8 illustrates a concrete connection circuit for connecting the control apparatus 36 and the control devices 38A through 38D by the signal wires 16. In this figure, PC1 through PC10 are photocouplers, R1 through R5 are resistors, I1 through I5 are inverters, Tr1 through Tr4 are transistors, and L is a logic IC.

In accordance with this circuit, for example, during the time over which the transistor Tr1 is held on by the logic IC, the control device 38A applies a signal to the light-emitting diode of the photocoupler PC2 connected to the output side of control device 38A. A signal can thereby be sent from the control device 38A to the control apparatus 36 via the phototransistor of the photocoupler PC2, the transistor Tr1, the photocoupler PC9 and the inverter I5. Conversely, due to the control apparatus 36 applying a signal to the light-emitting diode of the photocoupler PC10, a signal can be sent from the control apparatus 36 to the input of the control device 38A. In the same way, by turning any of the transistors Tr2 through Tr4 on and applying a signal as described above, signals can be sent and received between the control apparatus 36 and any of the control devices 38B through 38D.

Next, the address setting routine executed by the control apparatus 36 and the control devices 38A through 38D will be described.

The address setting routine is executed when all of the coolant pipes and the signal wires between the exterior device and the interior devices have been connected, and power source wiring work has been completed, and all of the interior devices have been supplied with electricity, and the switches of all of the interior devices are positioned at their operation positions. The piping work and wiring work are carried out without taking into account the addresses of the interior devices. The following explanation includes an example in which the addresses 0 through 3 correspond to the coolant pipe connecting ports P0 through P3 and the signal wire connectors C0 through respectively. However, the corresponding relationships between the addresses 0 through 3, the coolant pipe connecting ports P0 through P3 and the plurality of signal wire connectors C0 through C3 may be changed.

Figure 4:
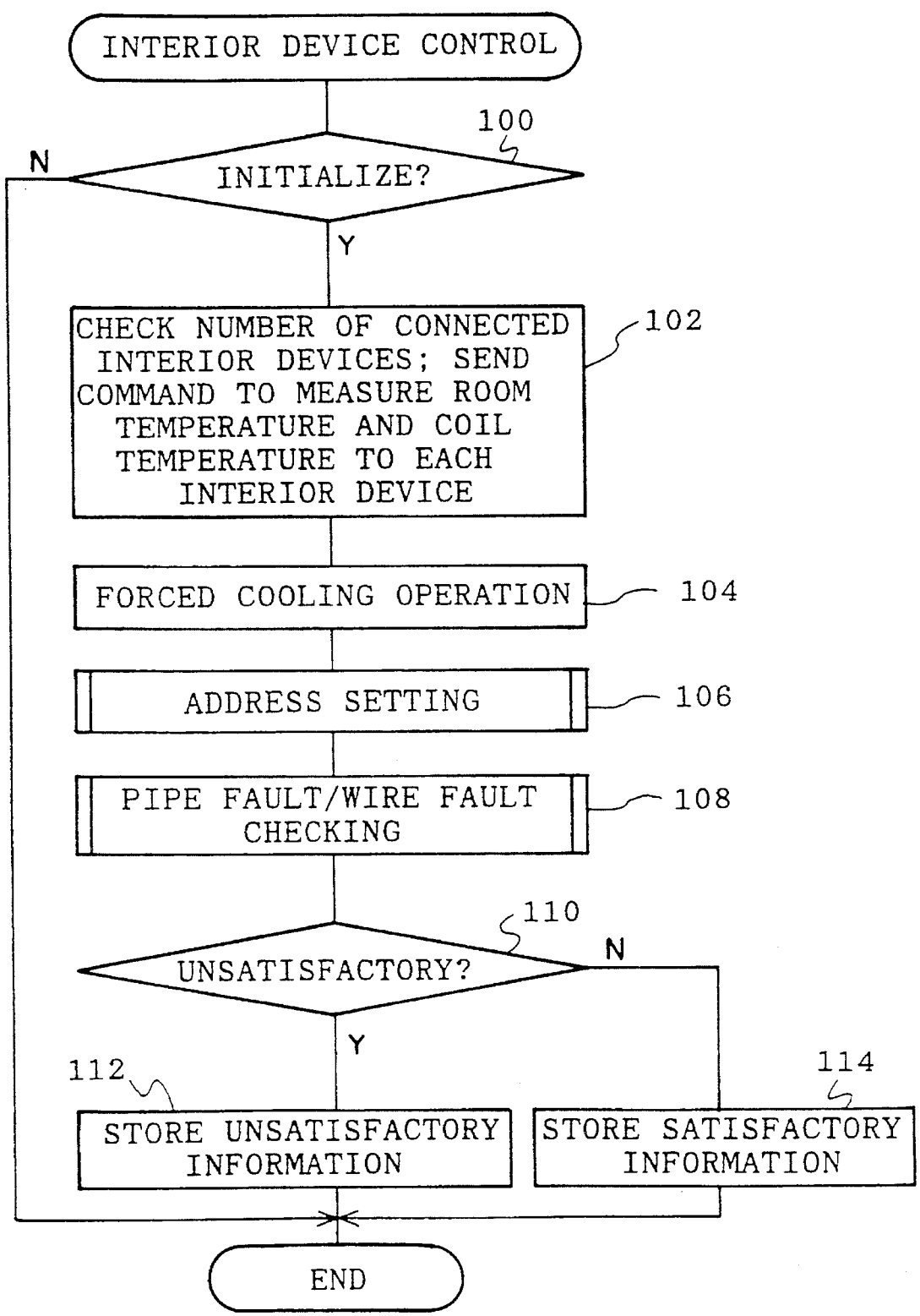
FIG. 4 is a flowchart illustrating an address setting routine for an exterior device control device.

FIG. 4 illustrates the address setting routine executed by the control devices 36 of the interior devices. In step 100, by determining the storage contents of the non-volatile memory 46, a determination is made as to whether it is necessary to initialize the interior device addresses, i.e., a determination is made as to whether the interior device addresses are properly set. If addresses have not been set, in step 102, the number of interior devices connected to the exterior device 10 is determined by detecting the voltage (e.g., DC 15 volts) from the interior devices on the respective signal wires 16. Also in step 102, commands are given to the respective interior devices so that the current room temperatures and coil temperatures are read from the room temperature sensors 50A through 50D and the temperature sensors 40A through 40D, and are stored in the RAMs or the like of the respective interior devices. In step 104, the four way type valve 22 is switched to the cooling operation side (the state illustrated by the solid line in FIG. 2), and the compressor 20 is forcibly operated regardless of the output from the room temperature sensors so that cooling operation is possible by the interior device heat exchangers. In step 106, address setting which will be described later is carried out. In step 108, pipe fault/wire fault checking, which will also be described later, is carried out. In step 110, a determination is made as to whether data sent from the interior devices indicates "satisfactory". If it is determined that the data indicates "unsatisfactory", in step 112, the "unsatisfactory" information is stored in the RAM of the control device 36. When the data does not indicate "unsatisfactory", the "satisfactory" information is stored in step 114.

Figure 5A:
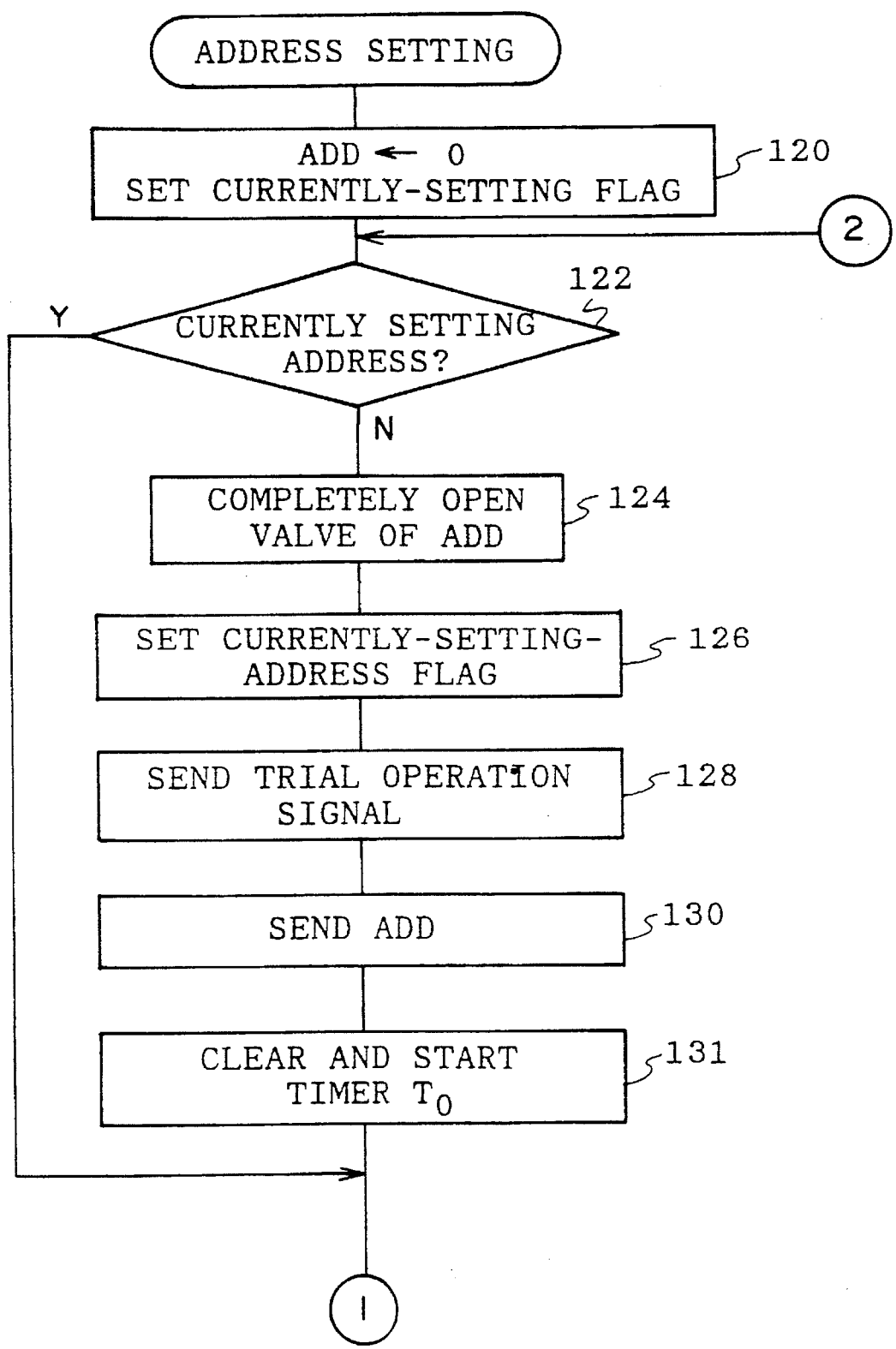
FIGS. 5A and 5B show a flowchart illustrating details of step 106 of FIG. 4.
Figure 5B:
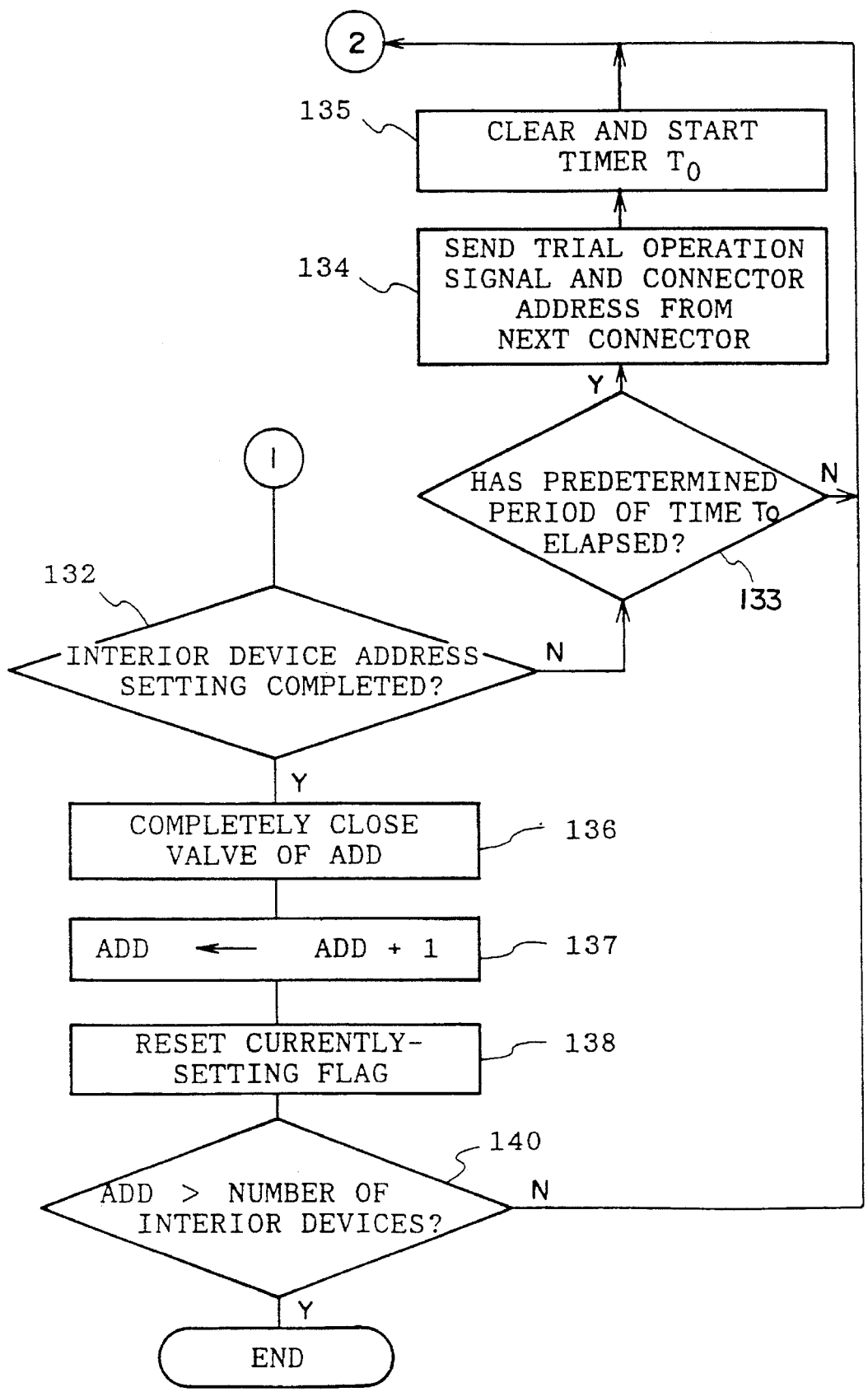

FIGS. 5A and 5B illustrate the details of the address setting routine of step 106. In step 120, first, the address ADD is set to 0. In step 122, a determination is made as to whether the address is being set, i.e., as to whether the currently-setting-address flag is set. If the address is not being set, i.e., if the currently-setting-address flag is not set, in step 124, the flow regulating valve 18A connected to the coolant pipe connecting port P0 corresponding to the address ADD is opened completely, and the other flow regulating valves 18B through 18D are closed completely. In step 126, the currently-setting-address flag indicating that the address is being set is set. In step 128, a trial operation signal and a signal indicating that the operation mode is cooling are sent to the interior device which is connected via the signal wire 16 connected to the connector C0 which corresponds to the address ADD. In step 130, the address ADD is sent as a dummy address to this interior device, and in step 131, a timer $T_O$ is cleared and started. Due to the sending of the trial operation signal in step 128, the control device of the interior device which received the trial operation signal executes the interior device trial operation routine illustrated in FIGS. 6A and 6B.

In subsequent step 132, due to a determination regarding the state of an interior device address setting completion signal which is sent from the interior device, a determination is made as to whether address setting for the interior device whose address is currently being set has been completed, i.e., a determination is made as to whether trial operation of the interior device has been effected satisfactorily. The interior device address setting completion signal is sent from the interior device in a case fin which setting of the address of the interior device has been completed and trial operation of the interior device has been carried out satisfactorily. In a case in which the setting of the address of the interior device has not been completed, a determination is made in step 133 as to whether a predetermined period of time has elapsed, i.e., as to whether the time set on the timer, which was started in step 131, has elapsed. If the predetermined period of time has not elapsed, steps 122, 132 and 133 are repeated.

Here, description has been given of a case in which the signal wire 16 from the connector C0 illustrated in FIG. 1 is connected to the interior device 12A connected to the corresponding coolant pipe connecting port P0. Therefore, the interior device address setting completion signal, which indicates that address setting for the interior device has been completed, is received in step 132 from the control device 38A of the interior device 12A within the predetermined period of time.

However, for example, in a case such as that of the signal wire from the connector C2 shown in FIG. 1 which is connected to the interior device 12D which is different from the interior device 12C connected to the corresponding coolant pipe connecting port P2, the interior device address setting completion signal will not be received even if the predetermined period of time elapses. In the present invention, even in cases such as this type of connection, the port P2 and the connector C3 are stored in correspondence and the port P3 and the connector C2 are stored in correspondence in the case shown in FIG. 1. In this way, subsequent control is made possible. As a result, when the interior device address setting completion signal is not received even if the predetermined period of time has elapsed (i.e., when the answer to the determination in step 133 is "Yes"), it is determined that the interior device whose flow regulating valve is fully open and the interior device to which the trial operation signal and the dummy address were sent via the signal wire are different. The flow regulating valve remains as it is, and in step 134, the trial operation signal and the dummy address (ADD=0) are sent via the signal wire connected to the next signal wire connector. After the timer $T_0$ is cleared and started, steps 122, 132 and 133 are repeated in the same way as described above. These steps are repeated until the interior device address setting completion signal is sent from the interior device due to the interior device, whose flow regulating valve is fully open, and the interior device, to which the trial operation signal and the dummy address are sent via the signal wire, being the same.

In this way, when the interior device address setting completion signal is received in step 132, in step 136, the flow regulating valve 18A of the address ADD is closed fully, and in step 137, the address ADD is incremented by 1. In step 138, the currently-setting-address flag is reset, and in step 140, a determination is made as to whether the value of the address ADD is greater than the number of interior devices connected to the exterior device. If the value of the address ADD has not exceeded the number of interior devices, the process returns to step 122.

Because the currently-setting-address flag is reset in step 138, the process proceeds from step 122 to step 124. The next flow regulating valve 18B is opened completely, and, in the same way as described above, the trial operation signal is sent to the interior device connected to the address ADD. The address ADD is sent as a dummy address and the process waits until address setting has been completed at the interior device. The same processes as described above are repeated until the value of the address exceeds the number of interior devices.

In this way, when only one of the flow regulating valves is completely open, the trial operation signal and the dummy address are sent via the corresponding signal wire and the process waits for completion of the setting of the address of the interior device. In a case in which address setting has not been completed, the signal wire is changed in order and sending of the trial operation signal and the dummy address are repeated until the address of the interior device is set. When address setting has been completed, only the next flow regulating valve is opened completely, and the signal wire is changed in order if necessary, and sending of the trial operation signal and the dummy address are repeated until the address of the interior device is set.

In this way, by repeating the routine in FIGS. 5A and 5B, when address setting has been completed at all of the interior devices connected to the exterior device, this routine is completed, and the process proceeds to step 108.

Figure 6A:
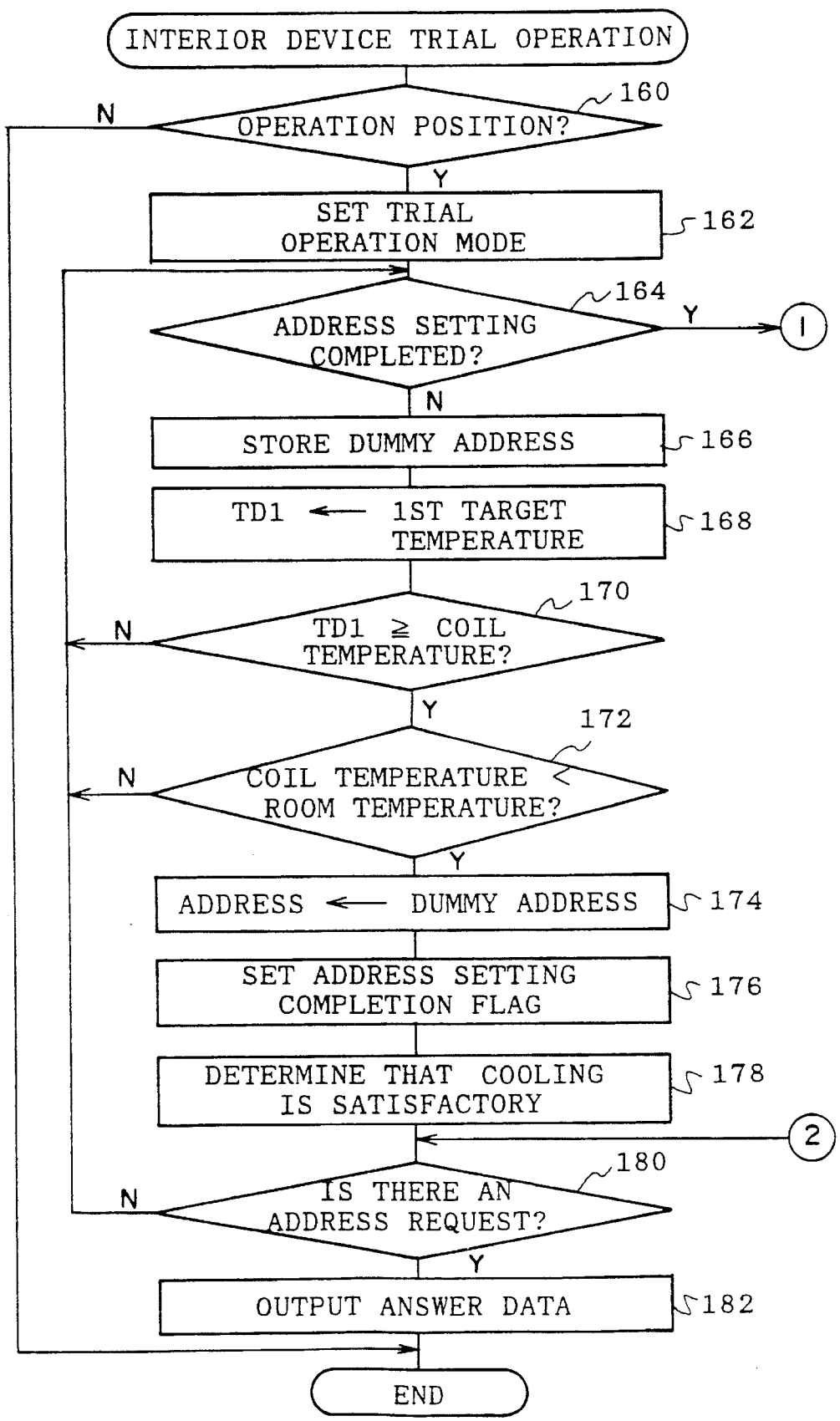
FIGS. 6A and 6B show a flowchart illustrating an interior device trial operation control routine.
Figure 6B:
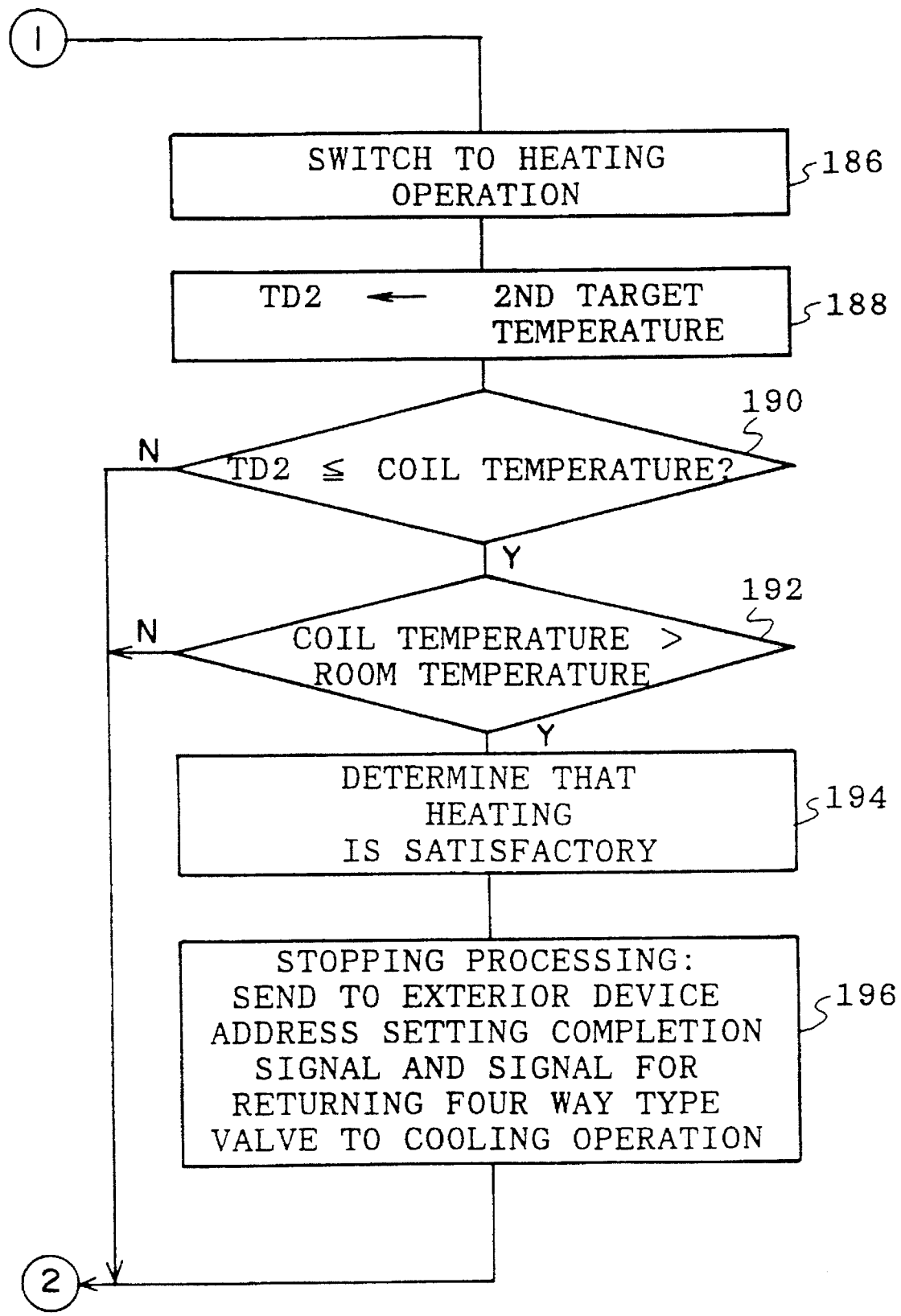

FIGS. 6A and 6B illustrate an interior device trial operation routine which is activated by the trial operation signal of step 128. Although explanation will be given hereinafter of a case in which the interior device 12A receives the trial operation signal, the operations of FIGS. 6A and 6B are also carried out when the interior devices 12A through 12D receive the trial operation signal. When the trial operation signal is received, the routine in FIGS. 6A and 6B is activated. In step 160, a determination is made as to whether the switch of the interior device is positioned at its operation position. When the switch is at the operation position, in step 162, the trial operation mode is set at the interior device. In this trial operation mode, the interior air blower is held in a strong blowing state, the flap is set at its upper side position, and the fact that a trial operation is in progress is displayed by an unillustrated LED provided at the interior device being lit or the like.

In step 164, a determination is made as to whether the address setting completion flag has been reset. When it is determined that address setting has not been completed, in step 166, the address ADD sent from the exterior device is stored in the RAM as a dummy address. In step 168, the room temperature and coil temperature measured and stored in the RAM or the like due to a command from the exterior device in step 102 of FIG. 4 are read from the RAM, and the lower temperature of a temperature, which is a predetermined value (e.g., 5° C.) less than the read coil temperature, and a temperature, which is a predetermined value (e.g., 10° C.) less than the read room temperature, is set as a first target temperature TD1.

In step 170, a determination is made as to whether the present coil temperature is less than or equal to the first target temperature TD1. In step 172, a determination is made as to whether the current coil temperature is less than the current room temperature. Due to the determinations of steps 170 and 172, a determination is made as to whether the interior device itself is actually carrying out cooling operation. If either of the determinations in steps 170 and 172 is negative, the process returns to step 164. When both of the determinations are positive, it is determined that the interior device itself is actually operating in the operation mode sent from the external device, and the dummy address stored in the RAM is stored in the nonvolatile memory 44A as the personal address of the interior device. In step 176, the address setting completion flag is set, and in step 178, it is determined that the cooling operation is satisfactory, and the contents of the determination are stored.

In subsequent step 180, a determination is made as to whether there was an address send request from the exterior device. When there is an address send request, in step 182, the personal address of the interior device stored in the non-volatile memory 44A is sent to the exterior device as answer data. However, because up to the present time there should not have been an address send request from the exterior device, the process returns to step 164.

In step 164, it is determined that address setting has been completed because the address setting completion flag is set in step 176. When it is determined that address setting has been completed, in step 186, the mode is switched to the heating operation mode, a signal indicating that the mode is the heating operation mode is sent to the exterior device, and the four way type valve is switched to the heating operation side. In step 188, the room temperature and coil temperature measured and stored in the RAM or the like due to a command from the exterior device in step 102 of FIG. 4 are read from the RAM, and the higher temperature of a temperature, which is a predetermined value (e.g., 5° C.) higher than the read coil temperature, and a temperature, which is a predetermined value (e.g., 10° C.) higher than the read room temperature, is set as a second target temperature TD2. In steps 190 and 192, by determining whether the coil temperature is greater than or equal to the second target temperature TD2, and by determining whether the coil temperature has exceeded the room temperature, it can be determined that the interior device itself is actually carrying out heating operation. When the answer to either determination is negative, the process proceeds to step 180. When the answers to both determinations are affirmative, in step 194, it is determined that the heating operation is satisfactory, and the determination contents are stored. Then, in the stopping process of step 196, a signal indicating address setting completion and a signal returning the four way type valve to the cooling operation mode are sent to the exterior device. The signal indicating address setting completion is received at the exterior device in step 132 of FIG. 5B.

The above-described routine of FIGS. 6A and 6B is executed by each control device of the interior devices which receive the trial operation signal of the exterior device.

In this way, at each of the interior devices, a determination is made as to whether the interior device itself is operating in the trial operation mode designated at the exterior device. When the interior device is operating in the designated operation mode, the set dummy address is set as the personal address of the interior device. When there is an address send request from the exterior device as will be described later, the personal address and the determination contents stored in step 178 and in step 194 are sent to the exterior device, and in step 114 or the like of FIG. 4, are stored at the exterior device.

Figure 7:
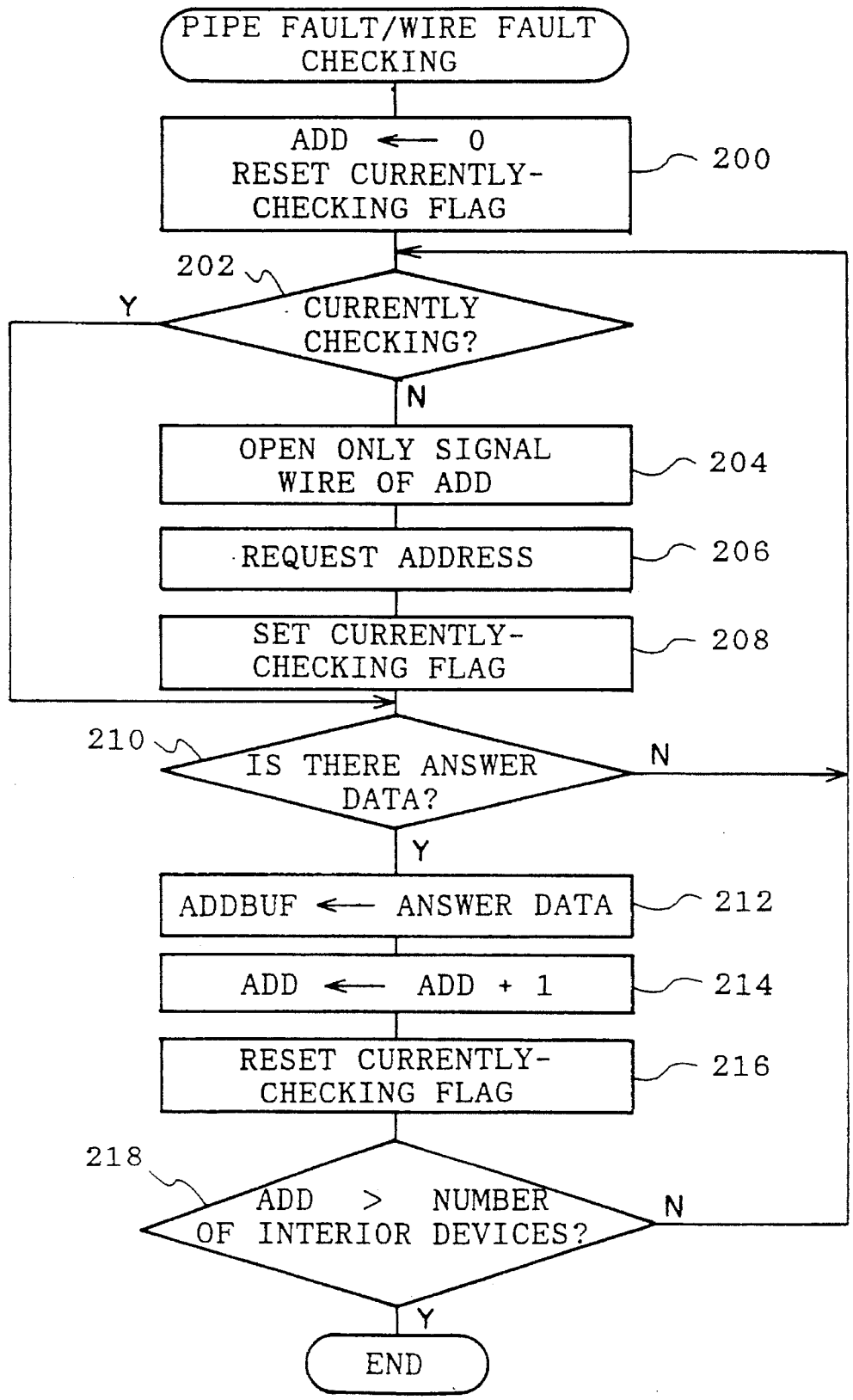
FIG. 7 is a flowchart illustrating details of step 108 of FIG. 4.

FIG. 7 illustrates details of the pipe fault/wire fault check routine of step 108 of FIG. 4. In step 200, the address ADD is set to 0. In step 202, by determining whether a currently-checking flag is set, a determination is made as to whether pipe fault/wire fault checking is being carried out. If checking is not being carried out, in step 204, only the signal wire which is connected to the connector C0 corresponding to the address ADD is opened. In step 206, a request to send the set address is sent via this signal wire. In step 208, the currently-checking flag for indicating that checking is being carried out is set.

When the address send request is sent in step 206, the request is received by the interior device in step 180 of FIG. 6A. The interior device which has received the address send request sends the address defined in step 174, the cooling satisfaction determination of step 178, the heating satisfaction determination of step 194, and the like, to the exterior device as the answer data of step 182. Accordingly, in subsequent step 210, at the exterior device, a determination is made as to whether the answer data from the interior device connected via the signal line to the connector of the address ADD has been sent. If the answer data has been sent, in step 212, the answer data is stored in the non-volatile memory 46 as the address ADDBUF. In step 214, in order to check the wire of the next interior device, the address ADD is incremented by 1, and in step 216, the currently-checking flag is reset. In step 218, a determination is made as to whether the address ADD is greater than the number of interior devices connected to the exterior device. If the address ADD is greater than the number of interior devices, a determination is made that checking of all of the interior devices has been completed, and this routine ends.

In this way, the addresses set at the interior devices are sent to the exterior device and stored.

The above explanation describes an example in which four interior devices are connected to the exterior device. However, the number of interior devices connected to the exterior device is not limited to this number. Further, address setting can be carried out in the above-described manner even in a case in which a plurality of exterior devices are connected to a single interior device.

The above description includes an example in which a trial operation signal and an address are sent in order to the control devices of the respective interior devices. However, when only one flow regulating valve is fully open, an address is set at only the control device of one interior device. Therefore, a trial operation signal and an address may be sent simultaneously via all of the connectors to the control devices of all of the interior devices. The control device of the interior device connected to the connector which has received the address setting completion signal can be determined to correspond to the interior device connected to the fully open flow regulating valve.

In accordance with the above-described embodiment, in a state in which the exterior device and the interior devices are connected via the coolant pipes and the signal wires, each of the interior devices is trial operated, and an address is set for the interior device which is actually trial operated. Thereafter, the set address is sent to the exterior device via the signal wire. Accordingly, even if the interior devices and the exterior device are not connected in accordance with predetermined addresses, i.e., even if addresses are not set in advance, addresses can be automatically set when the exterior device and the interior devices are in a connected state.

In accordance with the present invention described above, because an address is set in a state in which a first unit and a second unit are connected, there is no need to set the address in advance or provide a sensor for setting the address. Accordingly, address setting can be effected quickly and with a simple structure.

While the embodiment of the present invention disclosed herein constitutes a preferred form, it is to be understood that other forms are possible.

What is claimed is:

1. A multi-type air conditioner address setting method for a multi-type air conditioner in which a single first unit and a plurality of second units are connected by coolant pipes and signal wires such that a cooling cycle for air conditioning operation is formed by the single first unit and the plurality of second units, the first unit having a plurality of coolant pipe connecting portions for connection with the coolant pipes connected to the respective second units and a plurality of signal wire connecting portions for connection with the signal wires connected to the respective second units, said address setting method comprising:

an operating step in which coolant is supplied from the first unit, via a coolant pipe connected to one of the plurality of coolant pipe connecting portions, to a second unit connected to the coolant pipe so that the second unit is operated in a predetermined state;

a dummy address sending step in which a dummy address is sent from the first unit, via a signal wire connected to one of the plurality of signal wire connecting portions, to a second unit connected to said signal wire;

a personal address storing step in which the second unit which receives the dummy address from the first unit via said signal wire determines whether the second unit is operating in the predetermined state, and in a case in which it is determined that the second unit is operating in the predetermined state, the second unit stores the dummy address sent from the first unit as the personal address of the second unit;

an address storing repeating step in which said operating step, said dummy address sending step, and said personal address storing step are repeated for second units which are connected to coolant pipes connected to coolant pipe connecting portions other than said one coolant pipe connecting portion, so that all of the second units store respective personal addresses; and an address sending-back step in which the first unit sends an address request signal from the plurality of signal wire connecting portions to the respective second units to cause the respective second units to send back the personal addresses stored in the respective second units to the first unit, wherein said first unit determines the addresses of the second units connected to the signal wire connecting portions on the basis of which of the signal wire connecting portions the personal addresses of the respective second units sent back in said address sending-back step were sent back through.

2. A multi-type air conditioner address setting method according to claim 1, further comprising the following steps between said personal address storing step and said address storing repeating step:

an operation signal sending-back step in which, after the dummy address is stored as the personal address of the second unit, the second unit sends back to the first unit via said signal wire a signal indicating that the second unit has operated in the predetermined state; and a repeating step in which, in a case in which the first unit does not receive the signal indicating that the second unit has operated in the predetermined state from the second unit to which the dummy address was sent, the first unit sends the dummy address via a signal wire connected to a signal wire connecting portion which is different from the signal wire connecting portion to which said signal wire is connected, and the first unit repeats sending of the dummy address until the first unit receives the signal indicating that the second unit has operated in the predetermined state, wherein said address storing repeating step repeats said operation, signal sending-back step and said repeating step in addition to said operating step, said dummy address sending step and said personal address storing step, so that all of the second units store the respective personal addresses.

3. A multi-type air conditioner address setting method according to claim 1, wherein said first unit is an exterior unit and said second units are interior units.

4. A multi-type air conditioner address setting method according to claim 1, wherein the coolant pipes connected to the respective second units are connected to the respective coolant pipe connecting portions of the first unit via respective flow regulating valves.

5. A multi-type air conditioner address setting method according to claim 3, wherein the first unit includes a heat exchanger, an air blower, a compressor, an accumulator, a four way type valve and a control device, and each of the second units includes a heat exchanger, an air blower, a control device, a temperature sensor for coil temperature detection which is connected to the control device of the second unit, and a room temperature sensor for room temperature detection which is connected to the control device of the second unit.

6. A multi-type air conditioner address setting method for a multi-type air conditioner in which a single first unit and a plurality of second units are connected by coolant pipes and signal wires such that a cooling cycle for air conditioning operation is formed by the single first unit and the plurality of second units, the first unit having a plurality of coolant pipe connecting portions for connection with the coolant pipes connected to the respective second units and a plurality of signal wire connecting portions for connection with the signal wires connected to the respective second units, said address setting method comprising:

an operating step in which coolant is supplied from the first unit, via a coolant pipe connected to one of the plurality of coolant pipe connecting portions, to a second unit connected to the coolant pipe so that the second unit is operated in a predetermined state;

a dummy address sending step in which a dummy address is sent from the first unit, via a signal wire connected to one of the plurality of signal wire connecting portions, to a second unit connected to said signal wire;

a personal address storing step in which the second unit which receives the dummy address from the first unit via said signal wire determines whether the second unit is operating in the predetermined state, and in a case in which it is determined that the second unit is operating in the predetermined state, the second unit stores the dummy address sent from the first unit as the personal address of the second unit:

an operation signal sending-back step in which, after the dummy address is stored as the personal address of the second unit, the second unit sends back to the first unit via said signal wire a signal indicating that the second unit has operated in the predetermined state;

a repeating step in which, in a case in which the first unit does not receive the signal indicating that the second unit has operated in the predetermined state from the second unit to which the dummy address was sent, the first unit sends the dummy address via a signal wire connected to a signal wire connecting portion which is different from the signal wire connecting portion to which said signal wire is connected, and the first unit repeats sending of the dummy address until the first unit receives the signal indicating that the second unit has operated in the predetermined state;

an address storing repeating step in which said operating step, said dummy address sending step, said personal address storing step, said operation signal sending-back step and said repeating step are repeated for second units which are connected to coolant pipes connected to coolant pipe connecting portions other than said one coolant pipe connecting portion, so that all of the second units store respective personal addresses; and an address sending-back step in which the first unit sends an address request signal from the plurality of signal wire connecting portions to the respective second units to cause the respective second units to send back the personal addresses stored in the respective second units to the first unit, wherein said first unit determines the addresses of the second units connected to the signal wire connecting portions on the basis of which of the signal wire connecting portions the personal addresses of the respective second units sent back in said address sending-back step were sent back through.

7. A multi-type air conditioner address setting method according to claim 6, wherein said first unit is an exterior unit and said second units are interior units.

8. A multi-type air conditioner address setting method according to claim 6, wherein the coolant pipes connected to the respective second units are connected to the respective coolant pipe connecting portions of the first unit via respective flow regulating valves.

9. A multi-type air conditioner address setting method according to claim 7, wherein the first unit includes a heat exchanger, an air blower, a compressor, an accumulator, a four way type valve and a control device, and each of the second units includes a heat exchanger, an air blower, a control device, a temperature sensor for coil temperature detection which is connected to the control device of the second unit, and a room temperature sensor for room temperature detection which is connected to the control device of the second unit.

10. A multi-type air conditioner address setting method for a multi-type air conditioner in which a single first unit and a plurality of second units are connected by coolant pipes and signal wires such that a cooling cycle for air conditioning operation is formed by the single first unit and the plurality of second units, the first unit having a plurality of coolant pipe connecting portions for connection with the coolant pipes connected to the respective second units and a plurality of signal wire connecting portions for connection with the signal wires connected to the respective second units, said address setting method comprising:

an operating step in which coolant is supplied from the first unit, via a coolant pipe connected to one of the plurality of coolant pipe connecting portions, to a second unit connected to the coolant pipe so that the second unit is operated in a predetermined state;

a dummy address sending step in which a dummy address is sent from the first unit, via all of the signal wires connected to the plurality of signal wire connecting portions, to the second units connected to the signal wires;

a personal address storing step in which each of the second units which receive the dummy address from the first unit via the signal wires determines whether the second unit is operating in the predetermined state, and a second unit determined to be operating in the predetermined state stores the dummy address sent from the first unit as the personal address of the second unit determined to be operating in the predetermined state;

an address storing repeating step in which said operating step, said dummy address sending step, and said personal address storing step are repeated for second units which are connected to coolant pipes connected to coolant pipe connecting portions other than said one coolant pipe connecting portion, so that all of the second units store respective personal addresses; and an address sending-back step in which the first unit sends an address request signal from the plurality of signal wire connecting portions to the respective second units to cause the respective second units to send back the personal addresses stored in the respective second units to the first unit, wherein said first unit determines the addresses of the second units connected to the signal wire connecting portions on the basis of which of the signal wire connecting portions the personal addresses of the respective second units sent back in said address sending-back step were sent back through.

11. A multi-type air conditioner address setting method according to claim 10, wherein said first unit is an exterior unit and said second units are interior units.

12. A multi-type air conditioner address setting method according to claim 10, wherein the coolant pipes connected to the respective second units are connected to the respective coolant pipe connecting portions of the first unit via respective flow regulating valves.

13. A multi-type air conditioner address setting method according to claim 11, wherein the first unit includes a heat exchanger, an air blower, a compressor, an accumulator, a four way type valve and a control device, and each of the second units includes a heat exchanger, an air blower, a control device, a temperature sensor for coil temperature detection which is connected to the control device of the second unit, and a room temperature sensor for room temperature detection which is connected to the control device of the second unit.

14. A multi-type air conditioner address setting device for a multi-type air conditioner in which a single first unit and a plurality of second units are connected by coolant pipes and signal wires such that a cooling cycle for air conditioning operation is formed by the single first unit and the plurality of second units, the first unit comprising:

a plurality of coolant pipe connecting portions for connection with the coolant pipes connected to the respective second units and a plurality of signal wire connecting portions for connection with the signal wires connected to the respective second units;

operating means for operating each of the second units in a predetermined state by supplying coolant, via the coolant pipes connected to the plurality of coolant pipe connecting portions, from the first unit in order to the second units connected to the respective coolant pipes;

dummy address sending means for sending a dummy address from the first unit, via the signal wires connected to the plurality of signal wire connecting portions, to the second units connected to the respective signal wires;

address request signal sending means for sending an address request signal from %he plurality of signal wire connecting portions to each of the second units; and storing means for storing addresses sent back from the second units via the signal wire connecting portions in response to the address request signal, and each of the second units comprising:

determining means for determining whether the second unit is operating in the predetermined state when the dummy address is received from the first unit via the signal wire;

personal address storing means for, in a case in which said determining means determines that the second unit is operating in the predetermined state, storing the dummy address already sent from the first unit as a personal address of the second unit; and sending-back means for sending back, as address data, the personal address stored in said personal address storing means when the address request signal is received from the first unit via the signal wire.

15. A multi-type air conditioner address setting device according to claim 14, wherein said first unit is an exterior unit and said second units are interior units.

16. A multi-type air conditioner address setting device according to claim 14, wherein the coolant pipes connected to the respective second units are connected to the respective coolant pipe connecting portions of the first unit via respective flow regulating valves.

17. A multi-type air conditioner address setting device according to claim 15, wherein the first unit includes a heat exchanger, an air blower, a compressor, an accumulator, a four way type valve and a control device, and each of the second units includes a heat exchanger, an air blower, a control device, a temperature sensor for coil temperature detection which is connected to the control device of the second unit, and a room temperature sensor for room temperature detection which is connected to the control device of the second unit.

18. A multi-type air conditioner address setting device according to claim 14, wherein the operation of the predetermined state of the second unit is a cooling operation.

19. A multi-type air conditioner address setting device according to claim 14, wherein the operation of the predetermined state of the second unit is a cooling operation and a heating operation which follows the cooling operation.

* * * * *